United States Patent
Mogi et al.

(10) Patent No.: US 7,638,224 B2
(45) Date of Patent: Dec. 29, 2009

(54) FUEL CELL STACK

(75) Inventors: Satoshi Mogi, Yamato (JP); Masaaki Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 385 days.

(21) Appl. No.: 11/624,449

(22) Filed: Jan. 18, 2007

(65) Prior Publication Data
US 2007/0190383 A1   Aug. 16, 2007

(30) Foreign Application Priority Data
Feb. 13, 2006   (JP)   ............... 2006-035779

(51) Int. Cl.
*H01M 8/04*   (2006.01)
(52) U.S. Cl. .......................... 429/39; 429/38
(58) Field of Classification Search ........... None
See application file for complete search history.

(56) References Cited

U.S. PATENT DOCUMENTS 5,514,486 A   5/1996   Wilson

2004/0038103 A1*   2/2004   Wariishi et al. ............... 429/32
2005/0238943 A1*   10/2005   Akiyama et al. ............... 429/38
2007/0172720 A1   7/2007   Mogi et al.

FOREIGN PATENT DOCUMENTS

JP   04-355061   * 12/1992

* cited by examiner

*Primary Examiner*—John S Maples
(74) *Attorney, Agent, or Firm*—Fitzpatrick, Cella, Harper & Scinto (57) ABSTRACT

In order to provide a fuel cell stack which can sufficiently use a current range that can originally be output by a fuel cell unit, and from which high output can be obtained even with a small size, a thickness of an oxygen flow field plate is made large for a fuel cell unit having a relatively high temperature during operation, and the thickness of the oxygen flow field plate is made small for a fuel cell unit having a relatively low temperature during operation.

1 Claim, 6 Drawing Sheets

FUEL CELL STACK

BACKGROUND OF THE INVENTION

1. Field of the Invention

The present invention relates to a structure of a fuel cell stack in which fuel cell units are stacked to be connected in series.

2. Description of the Related Art

An amount of energy per volume and weight that can be generated by a fuel cell apparatus is much larger than that of a conventional secondary battery, and the fuel cell apparatus can be used repeatedly by refilling the fuel cell apparatus with a fuel. Thus, it is expected that the fuel cell apparatus is applicable for use in a digital camera, a mobile telephone, a laptop personal computer, or the like as the power source apparatus of portable electronic equipment, which can be used continuously for a long period of time.

U.S. Pat. No. 5,514,486 discloses an air breathing fuel cell stack in which hydrogen gas is reacted with oxygen in the atmosphere. Herein, a polymer electrolyte membrane is adopted as an electrolyte membrane of a fuel cell unit, and a porous fuel flow field plate and a porous oxygen flow field plate (oxygen supply layer) are adopted as a fuel supply layer and an oxidizer diffusion layer of the fuel cell unit, respectively. A catalyst layer is provided on both surfaces of the polymer electrolyte membrane. The fuel flow field plate for diffusing hydrogen gas over an entire surface of one catalyst layer is provided so as to be stacked on the one catalyst layer, and the oxygen flow field plate for diffusing oxygen in the atmosphere over the entire surface of the other catalyst layer is provided so as to be stacked on the other catalyst layer.

Hydrogen gas supplied to the catalyst layer through the fuel flow field plate generates protons by a catalyst reaction, and enters the polymer electrolyte membrane. On the other hand, oxygen supplied to the catalyst layer on an opposite side through the oxygen flow field plate is combined with the protons passed through the solid polymer electrolyte membrane by a catalyst reaction to generate water molecules. An electromotive force of the fuel cell unit is generally 1 V or less. Therefore, in a case where an output voltage equal to or higher than 1 V is required, the fuel cell units are stacked to be connected in series to assemble a fuel cell stack.

In a case of forming the air breathing fuel cell stack, an opening is provided on the side of a side surface of the fuel cell unit to introduce oxygen in the atmosphere into the stack. Oxygen is introduced through the side opening of the oxygen supply layer and diffused to the catalyst layer formed on a surface of the electrolyte membrane on an oxidizer electrode side through one major surface of the oxygen supply layer. Then, the water generated in the catalyst layer passes through a path reverse to that of oxygen mainly as water vapor and is discharged to the atmosphere from the side opening of the oxygen supply layer.

In the fuel cell stack in which fuel cell units having thicknesses equal to each other are stacked as disclosed in U.S. Pat. No. 5,514,486, generation efficiency tends to decrease in the fuel cell units provided in the middle of the stack, compared with fuel cell units at both ends. In the fuel cell units having poor radiation, which are provided in the middle of the stack, temperature of the oxygen supply layer increases, compared with that of the fuel cell units having satisfactory radiation, which are provided at both ends of the stack.

In general, when the temperature of the oxygen supply layer increases, water vapor partial pressure increases as compared with the case where the temperature of the oxygen supply layer is low. Therefore, oxygen partial pressure decreases. In the middle fuel cell units in which oxygen partial pressure has decreased due to an increase in temperature, a failure occurs in supplying oxygen to the electrolyte membrane, thereby decreasing the electromotive force, compared with the fuel cell units at both ends of the stack, in which the oxygen partial pressure remains high. Thus, when an attempt is made to maintain the output voltage of the entire fuel cell stack, the fuel cell stack needs to be operated with an output current low enough to leave an allowance to the fuel cell units at both ends of the stack so that a failure does not occur in supplying oxygen in the middle fuel cell units in which the temperature tends to increase. Specifically, the middle fuel cell units in which the generation efficiency has decreased due to a difference in temperature may limit the output current of the entire fuel cell stack.

Further, in the fuel cell stack in which a plurality of fuel cell units is stacked, each of the fuel cell units in the middle of the stack is influenced by the water vapor discharged from adjacent fuel cell units on both sides thereof, and the concentration of water vapor in the vicinity of the opening of the middle fuel cell units is likely to become higher than those of the fuel cell units at both ends of the fuel cell stack. Consequently, discharge efficiency of water vapor through the opening decreases, with a result that a failure is likely to occur in supplying of oxygen in the fuel cell units in the middle of the stack.

As a method of keeping the temperature of the fuel cell units in the middle of the stack low, there is a method of placing an air-cooling fan or the like to forcefully cool the fuel cell units in the middle of the stack. However, when a mechanism related to the forceful cooling is provided, the number of components increases to enlarge an outer size of the fuel cell apparatus, and consequently, an arrangement space for a fuel tank is reduced.

Also a method of operating the fuel cell stack while keeping the output current of the fuel cell stack extremely low is considered. However, when the output current is suppressed, a current range that can originally be output by the fuel cell unit cannot be used sufficiently, thereby resulting in an increase in the area of the fuel cell unit to ensure a current. Thus, the outer size of the fuel cell apparatus is enlarged to result in reducing the arrangement space of a fuel tank. Needless to say, in any of the methods, cost per output of a fuel cell increases remarkably.

SUMMARY OF THE INVENTION

An object of the present invention is to provide a fuel cell stack which can sufficiently use a current range that can originally be output by a fuel cell unit even without a mechanism related to forceful cooling. Another object of the present invention is to provide a fuel cell stack in which an output current of the fuel cell stack can be increased without a provision of an opening that is larger than necessary, whereby a large fuel tank space is ensured and a high output can be obtained for a long period of time.

More specifically, according to the first aspect of the present invention, a fuel cell stack includes a plurality of fuel cell units stacked, each having an oxygen supply layer on a side of one surface of an electrolyte membrane, wherein each of the oxygen supply layers has an opening opened to the atmosphere in at least a part of a side surface thereof, and diffuses oxygen in the atmosphere from the opening to the side of the one surface of the electrolyte membrane, and diffuses water vapor from the side of the one surface on the electrolyte membrane to the opening, and wherein an area of an opening of one fuel cell unit having a temperature higher than a temperature of another fuel cell unit during generation of electric power is larger than an area of an opening of the another fuel cell unit.

Further, according to the second aspect of the present invention, a fuel cell stack includes at least three fuel cell units stacked, each having an oxygen supply layer on a side of one surface of an electrolyte membrane, wherein each of the oxygen supply layers has an opening opened to the atmosphere in at least a part of a side surface thereof, and diffuses oxygen in the atmosphere from the opening to the side of the one surface of the electrolyte membrane side, and diffuses water vapor from the side of the one surface of the electrolyte membrane to the opening, and wherein the oxygen supply layer of the fuel cell unit provided in a middle of the stack is thicker than each of the oxygen supply layers of the fuel cell units provided at both ends of the stack.

Further, according to the third aspect of the present invention, a fuel cell stack includes a plurality of fuel cell units stacked, each having an oxygen supply layer on a side of one surface of an electrolyte membrane, wherein each of the oxygen supply layers has an opening opened to the atmosphere, in at least a part of a side surface thereof, and diffuses oxygen in the atmosphere from the opening to the side of one surface of the electrolyte membrane, and diffuses water vapor from the side of the one surface of the electrolyte membrane to the opening, and wherein ventilation performance of a gas from and to the atmosphere in an oxygen supply layer of one fuel cell unit having a water vapor partial pressure higher than a water vapor partial pressure of another fuel cell unit during operation is higher than ventilation performance of a gas from and to the atmosphere in an oxygen supply layer of the another fuel cell unit.

In the fuel cell stack of the present invention, by alleviating shortage in supply of oxygen, which is one reason for decrease in electric power generation efficiency of a fuel cell unit as its temperature increases, decrease of a maximum current value of the fuel cell unit in which a temperature has increased is suppressed, and the maximum current value of the entire fuel cell stack is kept high. Because of this, a large current that sufficiently uses a current range that can be output by separate fuel cell units in a low temperature portion and a high temperature portion can be taken out.

Other features and advantage of the present invention will become apparent from the following description taken in conjunction with the accompanying drawings.

DESCRIPTION OF THE EMBODIMENTS

Hereinafter, a fuel cell stack of the present invention will be described in detail with reference to the drawings. The fuel cell stack of the present invention is not limited to a specific structure of a fuel cell stack described below. As long as fuel cell units are stacked and oxygen in the atmosphere is introduced from a side surface thereof, the present invention can be realized in another embodiment in which a part or an entirety of the structure of the fuel cell stack is replaced by a substitute structure.

The fuel cell stack of the present invention can also be used when the fuel cell stack is integrally incorporated in portable small electrical equipment, such as a digital camera, a digital video camera, a small projector, a small printer, or a laptop personal computer, and a fuel tank is detachably provided.

As a fuel, hydrogen gas is typically used. However, an aqueous solution of methanol or ethanol may also be used. The case of using hydrogen gas will be described below.

Hydrogen gas is typically supplied by introducing a hydrogen gas stored in a high-pressure hydrogen tank or a hydrogen storage alloy. Alternatively, hydrogen gas may be generated from a liquid fuel such as methanol, a gaseous fuel, or a solid fuel, using a reforming apparatus. The case of using a fuel tank utilizing a hydrogen storage alloy will be described below.

Figure 1:
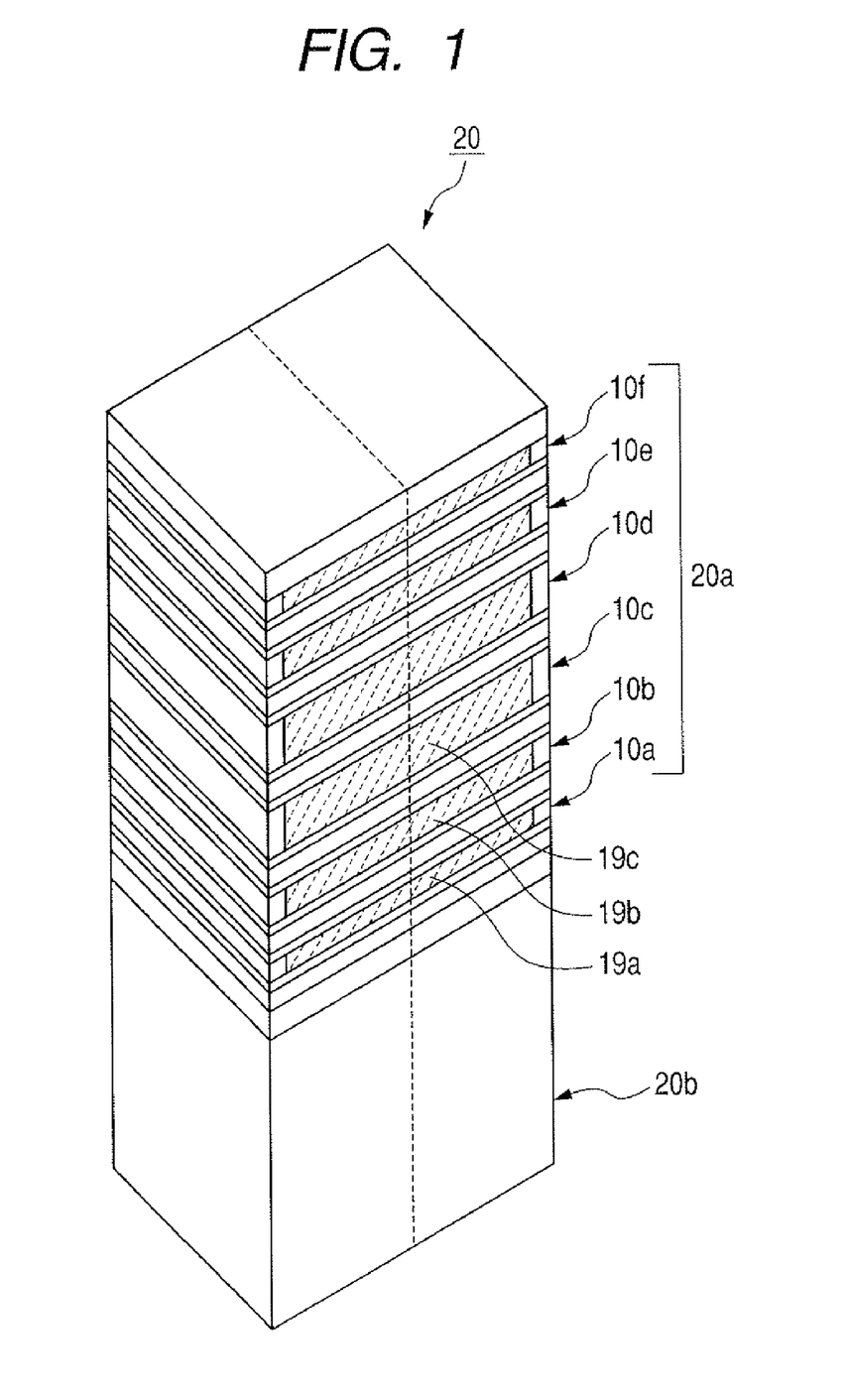
FIG. 1 is a schematic external appearance view showing an example of a fuel cell stack according to the present invention.
Figure 2:
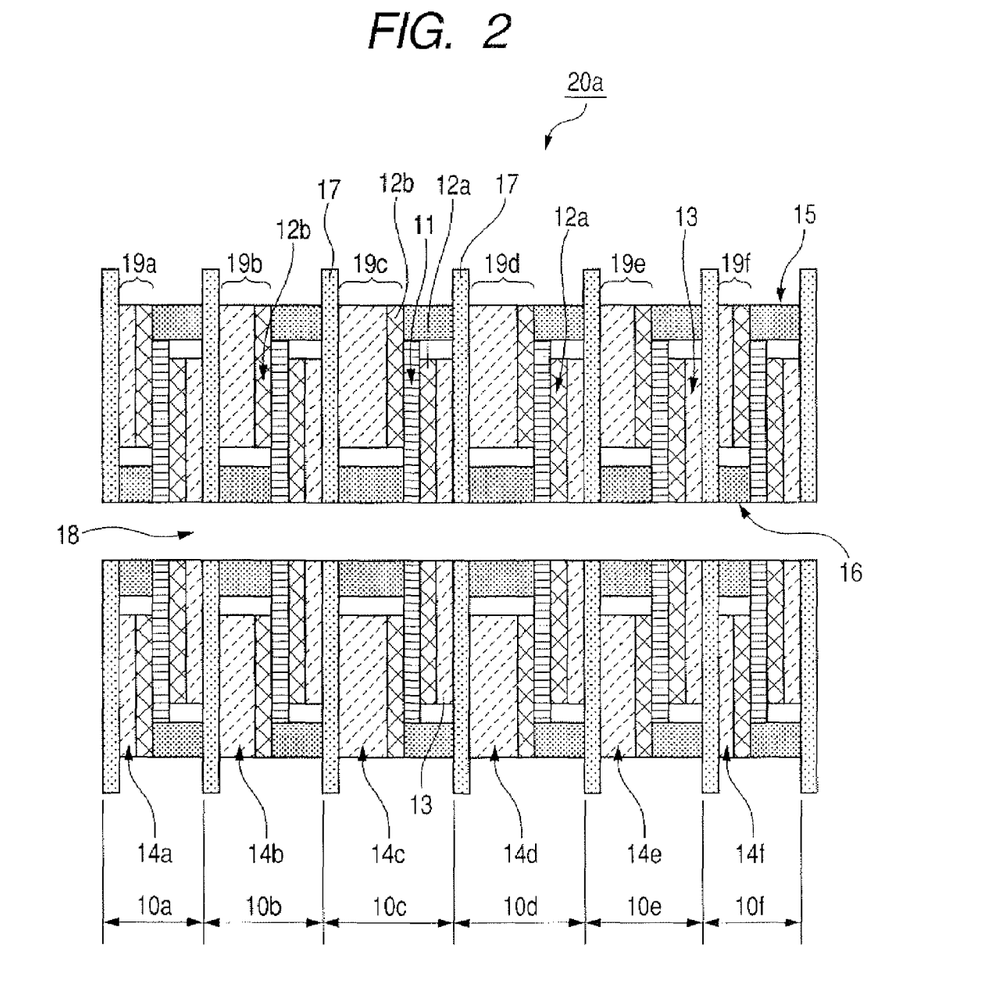
FIG. 2 is a schematic cross-sectional view showing an example of the fuel cell stack of the present invention.
Figure 3:
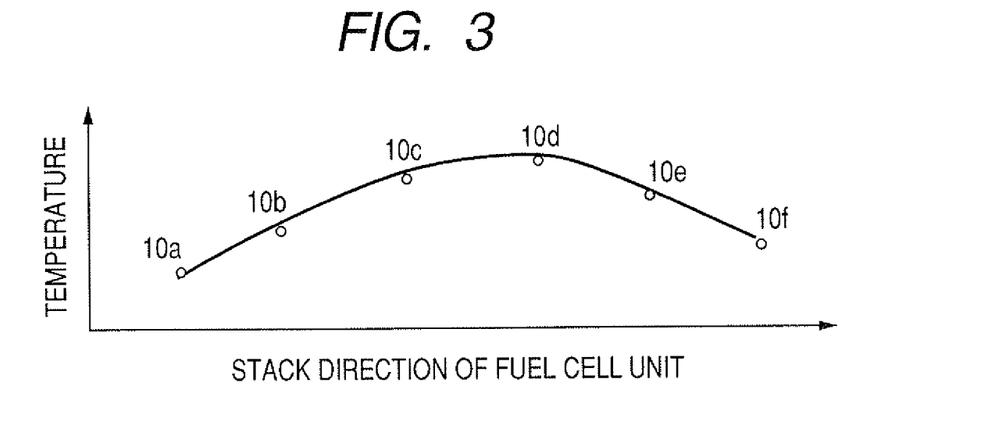
FIG. 3 is a graph showing a temperature distribution for each fuel cell unit in the fuel cell stack.
Figure 4:
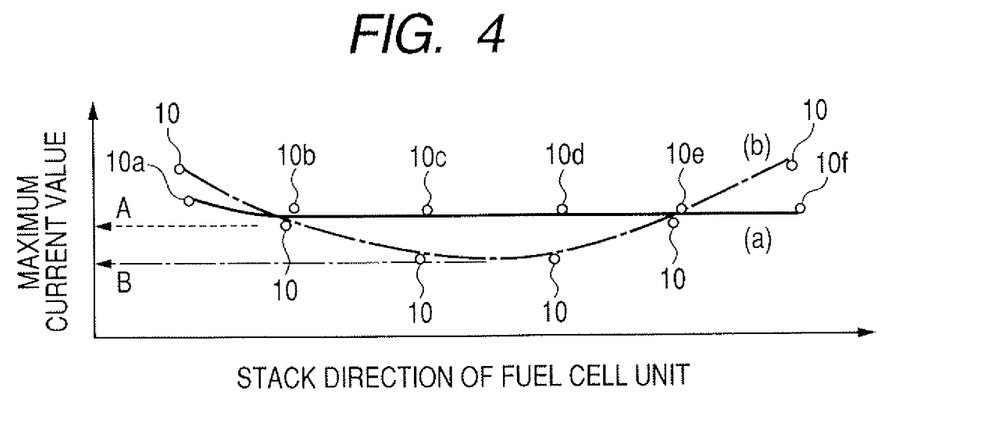
FIG. 4 is a graph showing an output current for each fuel cell unit in the fuel cell stack.

FIG. 1 is a schematic external appearance view of a fuel cell stack according to an embodiment of the present invention. FIG. 2 is a schematic cross-sectional view showing a structure of the fuel cell stack. FIG. 3 is a graph showing a temperature distribution of a fuel cell unit. FIG. 4 is a graph showing the maximum current of a fuel cell unit in the fuel cell stack.

In FIG. 1, a fuel cell stack 20 is designed to have an external appearance of a rectangular parallelepiped according to the accommodation space on a small electronic equipment side into which the fuel cell stack 20 is to be incorporated. The fuel cell stack 20a is composed of 6 stacked fuel cell units 10a to 10f. A hydrogen gas is accumulated into a fuel tank 20b connected to a lower part of the fuel cell stack 20a under a high pressure, using a hydrogen storage alloy. The fuel tank 20b includes a pressure adjusting mechanism (not shown), and supplies a hydrogen gas having a pressure reduced to a pressure slightly exceeding the atmospheric pressure to the fuel cell units 10a to 10f through a fuel flow field 18 (FIG. 2) provided so as to penetrate the fuel cell stack 20a along a center axis of the fuel cell stack 20a.

In the state shown in FIG. 1, openings 19a to 19f for introducing oxygen in the atmosphere into the fuel cell units 10a to 10f are respectively provided on a front surface side and a back surface side of the fuel cell stack 20. The cross-sectional view of the fuel cell stack 20a taken in the broken line of FIG. 1 is shown in FIG. 2.

In FIG. 2, the respective fuel cell units 10a to 10f constituting the fuel cell stack 20a are composed of the same members, except that the thicknesses of the respective oxygen flow field plates 14a to 14f are different. Herein, although the fuel cell unit 10c will be described as a representative so as to avoid redundancy, the same is also applied to the other fuel cell units 10a, 10b, and 10d to 10f.

A membrane electrode assembly 11 provided in the middle of the fuel cell unit 10c in the thickness direction has porous catalyst electrodes formed on both surfaces of a polymer electrolyte membrane. The membrane electrode assembly 11 generates protons from a hydrogen gas at the catalyst electrode on the hydrogen supply side, and moves the protons through the polymer electrolyte membrane, thereby combining oxygen with the protons at the catalyst electrode on the oxygen supply side to generate water molecules.

On the surface of the membrane electrode assembly 11 on the hydrogen supply side, a fuel electrode 12a is stacked, and on the surface thereof on the oxygen supply side, an oxidizer electrode 12b is stacked. The fuel electrode 12a and the oxidizer electrode 12b are each composed of a porous sheet material having conductivity, such as carbon cloth, and respectively diffuse and supply hydrogen gas and oxygen uniformly over the entire surface of the membrane electrode assembly 11.

The fuel electrode 12a can be composed of a material with a porosity smaller than that of the fuel flow field plate 13 in order to uniformly supply hydrogen to the entire surface of the membrane electrode assembly 11 on the hydrogen supply side. The oxidizer electrode 12b can be composed of a material with a porosity smaller than that of the oxygen flow field plate 14 in order to uniformly supply oxygen to the entire surface of the membrane electrode assembly 11 on the oxygen supply side, and floating particles in the atmosphere can be prevented from reaching the membrane electrode assembly 11.

The fuel flow field plate 13 is stacked so as to come into contact with the entire surface of the fuel electrode 12a on an opposite side to the side of the membrane electrode assembly 11. The fuel flow field plate 13 has a function of diffusing hydrogen gas supplied through the fuel flow field 18 along the center axis of the fuel cell stack 20a to the entire surface of the fuel electrode 12a. A sealing member 15 is provided on an outer circumference of the fuel flow field plate 13, thereby preventing hydrogen gas from being discharged to the atmosphere.

An oxygen flow field plate 14c is stacked so as to come into contact with the entire surface of the oxidizer electrode 12b on an opposite side to the side of the membrane electrode assembly 11. The oxygen flow field plate 14c has a function of diffusing oxygen in the atmosphere taken in through the opening 19c to the oxidizer electrode 12b. Further, the water vapor generated in the membrane electrode assembly 11 flows into the oxygen flow field plate 14c through the oxidizer electrode 12b, is diffused toward the side of the side surface on which the opening 19c is formed, and is discharged to the atmosphere through the opening 19c.

The fuel flow field plate 13 and the oxygen flow field plate 14c are each composed of a porous conductive material. The conductive porous material have a structure in which a number of gaps communicated with the outside are formed inside, a wall for partitioning the gaps is formed integrally of a constituent material, or materials constituting the wall for partitioning the gaps are strongly bound to each other.

As the materials constituting the fuel flow field plate 13 and the oxygen flow field plate 14c, any material can be used as long as it is conductive, stiff to such an extent that it is not greatly deformed even when the fuel cell stack is tightened and supplied with pressure so as to ensure conductivity, and sufficiently electrochemically stable under the condition of using the electrode. Examples of the materials include materials containing at least one kind of element selected from the group consisting of Au, Pt, Ag, Co, Pd, Rh, U, Ru, Os, Re, Ni, Cr, Fe, Mo, Ti, Al, Cu, V, Nb, Zr, Sn, In, Ga, Mg, Pb, Si, and W. They may be alloys. Alternatively, the surface of a member composed of another material may be plated with these materials. Examples of a metal having a gap include a foam metal, an electrodeposited metal, an electrolytic metal, a sintered metal, a fiber metal, or a combination of a plurality of these materials.

Further, a polymer, a metal oxide, and a carbon material can also be used as long as they have characteristics similar to those of the above, even if they are metal materials other than the above.

The polymer electrolyte membrane capable of being applied to the membrane electrode assembly 11 of the present invention is required to have high proton conductivity, chemical and electrochemical stability, a gas blocking property, and mechanical strength. Specific examples of the polymer electrolyte membrane include ion exchange membranes such as perfluorocarbon, non-perfluoro, and hybrid-based membranes. In particular, a perfluorosulfonic acid-based electrolyte membrane, a perfluoro carboxylic acid-based membrane, a styrene vinyl benzene-based membrane, and a quaternary ammonium-based anion exchange membrane can be used.

As the catalyst that can be applied to the membrane electrode assembly 11 of the present invention, platinum group metal such as platinum, rhodium, palladium, ruthenium, and iridium, and alloys containing at least one kind of those metals can be used. As a method of providing a catalyst on both electrode side surfaces of the polymer electrolyte membrane, the following method can be used. A catalyst may be precipitated to be fixed by chemical plating or the like. Also, a powder-like catalyst may be applied or pressed to be fixed onto the membrane surface. Further, a catalyst may be dispersed as fine particles on the surface of carbon particles, and the carbon particles carrying the catalyst may be applied to be fixed.

The sealing member 16 is provided so as to surround the fuel flow field 18, thereby preventing the hydrogen gas of the fuel flow field 18 from leaking to the oxygen flow field plate 14. Further, a plate-shaped separator 17 is provided between the oxygen flow field plate 14 of the adjacent fuel cell unit 10d and the fuel flow field plate 13, thereby preventing the movement of a gas therebetween.

A side surface of the oxygen flow field plate 14 (and a side surface of the oxidizer electrode 12b) partitioned in the stack direction by the separator 17 and the membrane electrode assembly 11 corresponds to an opening 19c for introducing oxygen into the fuel cell unit 10c and discharging water vapor.

Hydrogen gas flowing into the fuel flow field plate 13 of the fuel cell unit 10c through the fuel flow field 18 is diffused to the entire surface of the fuel electrode 12a through the fuel flow field plate 13, and is supplied to the membrane electrode assembly 11 through the fuel electrode 12a. In the catalyst layer of the membrane electrode assembly 11, hydrogen gas generates protons and flows into the polymer electrolyte membrane.

On the other hand, on the opposite side surface of the membrane electrode assembly 11, oxygen introduced through the opening 19c diffuses to the entire surface of the oxidizer electrode 12b through the oxygen flow field plate 14c, and reaches the membrane electrode assembly 11 through the oxidizer electrode 12b. In the catalyst layer of the membrane electrode assembly 11, oxygen is combined with protons to generate water molecules.

In the case where the connection from the fuel cell stack 20a to an external circuit is disconnected so that a current is not taken out from the fuel cell unit 10c, an open circuit voltage is generated on both surfaces of the membrane electrode assembly 11, whereby the generation of water molecules stops. However, when the fuel cell stack 20a is connected to the external circuit to take out a current from the fuel cell unit 10c, water molecules in a number corresponding to the current value continue to be generated, and various polarizations occur to decrease the electromotive force. The energy obtained from the product of a polarization voltage and a current becomes heat to heat the fuel cell unit 10c. The temperature of the heated fuel cell unit 10c increases, and the vapor pressure of water vapor in the oxygen flow field plate 14c increases. The pressure in the oxygen flow field plate 14c remains at the atmospheric pressure. Therefore, as the result of increase in water vapor pressure, the oxygen partial pressure in the oxygen flow field plate 14c decreases.

At this time, other fuel cell units are provided on both sides of the fuel cell units 10c and 10d provided in the vicinity of the center of the fuel cell stack in the stack direction, so that heat is hardly released from the fuel cell units 10c and 10d. Thus, the temperatures of the fuel cell units 10c and 10d become higher than those of the fuel cell units 10a and 10f provided on both ends of the stack, respectively, because of poor radiation. The oxygen flow field plates 14c and 14d of the fuel cell units 10c and 10d having high temperatures become lower in oxygen partial pressure than the oxygen flow field plates 14a and 14f of the fuel cell units 10a and 10f having low temperatures.

FIG. 3 shows a temperature distribution of the fuel cell units 10a to 10f at a time when the fuel cell stack 20a is allowed to generate electric power. The temperatures of the fuel cell units 10c and 10d provided in the vicinity of the center of the fuel cell stack 20a become higher than those of the fuel cell units 10a and 10f provided at both ends of the fuel cell stack 20a, respectively. The temperature may reach about 70° C. in the fuel cell units 10c and 10d, and may be about 30° C. in the fuel cell units 10a and 10f.

As shown in FIG. 2, in the fuel cell stack 20a, the thicknesses of the oxygen flow field plates 14a to 14f are previously set according to the temperatures of the fuel cell units 10a to 10f during operation. More specifically, the oxygen flow field plates 14c and 14d of the fuel cell units 10c and 10d provided in the vicinity of the center in the stack direction are thick as compared with the oxygen flow field plates 14a and 14f of the fuel cell units 10a and 10f provided at both ends thereof, respectively. The oxygen flow field plates 14b and 14e of the fuel cell units 10b and 10e provided at the intermediate positions between the fuel cell units 10a and 10c and between the fuel cell units 10d and 10f, respectively, have intermediate thicknesses therebetween.

Further, the areas of the openings 19c and 19d of the fuel cell units 10c and 10d provided in the vicinity of the center in the stack direction are large as compared with the areas of the openings 19a and 19f of the fuel cell units 10a and 10f provided at both ends, respectively. The areas of the openings 19b and 19e of the fuel cell units 10b and 10e provided between the fuel cell units 10a and 10c and the fuel cell units 10d and 10f have intermediate area sizes therebetween. The reason for this is that, ignoring the extremely thin oxidizer electrode 12b, the thicknesses of the oxygen flow field plates 14a to 14f are proportional to the areas of the openings 19a to 19f.

As a result, the fuel cell units 10c and 10d have higher ventilation performance of a gas from and to the atmosphere, compared with the fuel cell units 10a and 10f. Further, in the fuel cell units 10b and 10e, the ventilation performance of a gas with respect to the atmosphere is also at an intermediate level.

According to the above, even in the fuel cell units 10c and 10d having higher temperatures as compared with those of the fuel cell units 10a and 10f, the supply amount of oxygen in the oxygen flow field plates 14c and 14d is sufficiently secured, and the operation of maintaining a high output current can be performed. Thus, as indicated by a solid line (a) of FIG. 4, even in the fuel cell units 10c and 10d having high temperatures, the maximum current value is secured to be equal to that of the fuel cell units 10a and 10f provided at both ends, respectively. Consequently, a high current value can be ensured.

Figure 5:
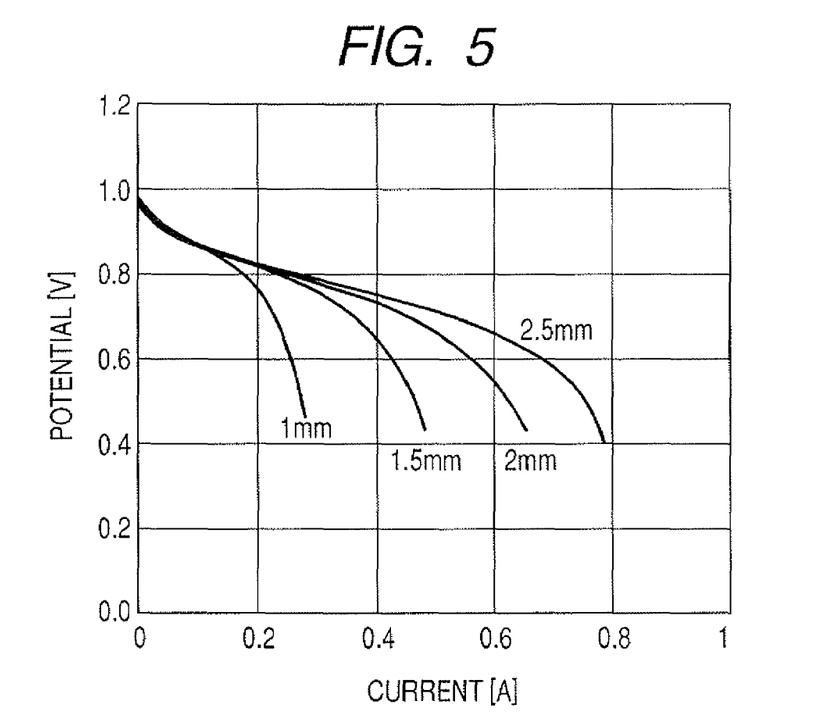
FIG. 5 is a graph showing current-voltage characteristics for various thicknesses of an oxygen flow field plate in a fuel cell unit of an air breathing fuel cell.
Figure 6:
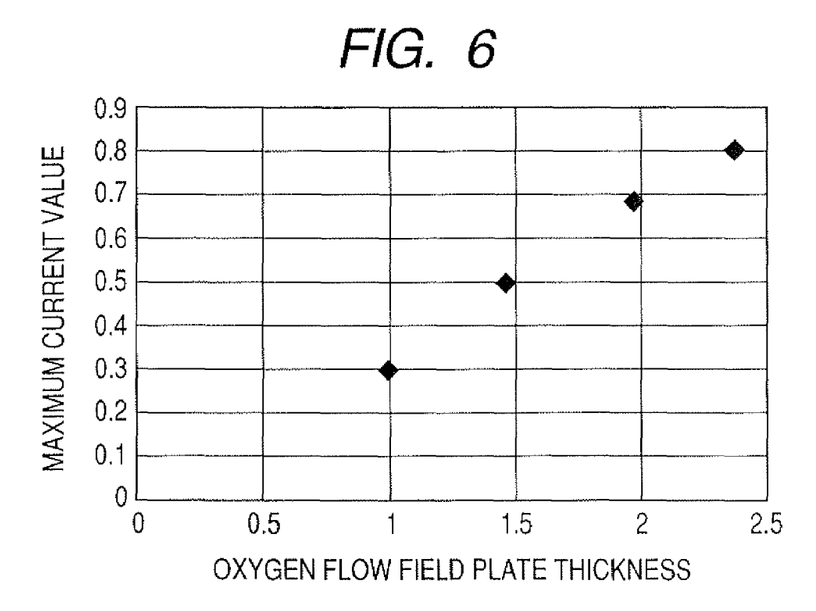
FIG. 6 is a graph showing a relationship between the thickness of the oxygen flow field plate in the fuel cell unit of the air breathing fuel cell and the maximum current value thereof.

FIG. 5 is a graph showing an example of current-voltage characteristics of a fuel cell unit of an air breathing fuel cell. FIG. 6 is a graph showing a relationship between the thickness of the oxygen flow field plate in the fuel cell unit of the air breathing fuel cell and the maximum current value.

In FIG. 5, each curve shows characteristics when the thickness of the oxygen flow field plate 14 varies. Numbers in FIG. 5 represent the thickness of the oxygen flow field plate 14. Although all characteristics exhibit the same characteristics in a low current range as shown in FIG. 6, as the thickness of the oxygen flow field plate 14 increases, the maximum current value increases. From this result, it is understood that, as the thickness of the oxygen flow field plate 14 increases, a higher output can be obtained.

However, when each oxygen flow field plate 14 is made uniformly thick, the volumes of all the fuel cell units 10 increase, and the full length of the stack obtained by stacking a plurality of fuel cell units 10 becomes remarkably long. Therefore, when considering an output value per unit volume (output density), it cannot be said that the output value becomes large as the thickness of the oxygen flow field plate 14 increases. Thus, it is necessary to appropriately select the thickness of the oxygen flow field plate 14 according to its application and structure.

In the embodiment of the present invention, as a material for the oxygen flow field plate 14, a metal plate made of porous nickel was used. Compared with the fuel flow field plate 13 through which hydrogen gas flows only in one direction, the oxygen flow field plate 14 that allows oxygen and water vapor to move in both directions by natural diffusion is designed to be thick. The thickness of the oxygen flow field plate 14 is 2 mm or more, with respect to the thickness of the fuel flow field plate 13 of 0.5 mm. For the same reason, the porosity of the fuel flow field plate 13 is set to be about 70%, and the porosity of the oxygen flow field plate 14 is set to be about 90%.

Further, as a polymer electrolyte membrane, a Nafion membrane (Trade Mark of E.I. du Pont de Nemours & Company) with a thickness of 50 µm is used, and a platinum film is sputtered as a catalyst on both surfaces of the polymer electrolyte membrane.

In the fuel cell stack 20 of the embodiment, the oxygen flow field plate in a fuel cell unit, a temperature of which was expected to increase during operation was made thick to promote the introduction of oxygen in the air. The oxygen flow field plate in a fuel cell unit, a temperature of which was expected to be relatively low was made thin. Thus, in the case where the temperature of a fuel cell unit not provided in the middle of the fuel cell stack 20a becomes high due to difference in radiation conditions and heat generation distribution (also influenced by the supply of fuel and the wettability of a polymer electrolyte) of the fuel cell stack 20a, the thickness of the oxygen flow field plate may be set based on the prediction of the temperature distribution.

Further, a method of facilitating the diffusion and supply of oxygen in the oxygen flow field plate can be realized according to not only the thickness of the oxygen flow field plate, but also the area of the opening, the diffusion resistance of the oxygen flow field plate, and the design of a container for accommodating the fuel cell stack 20*a* and the accommodation space on an equipment side.

Comparative Example

Figure 7:
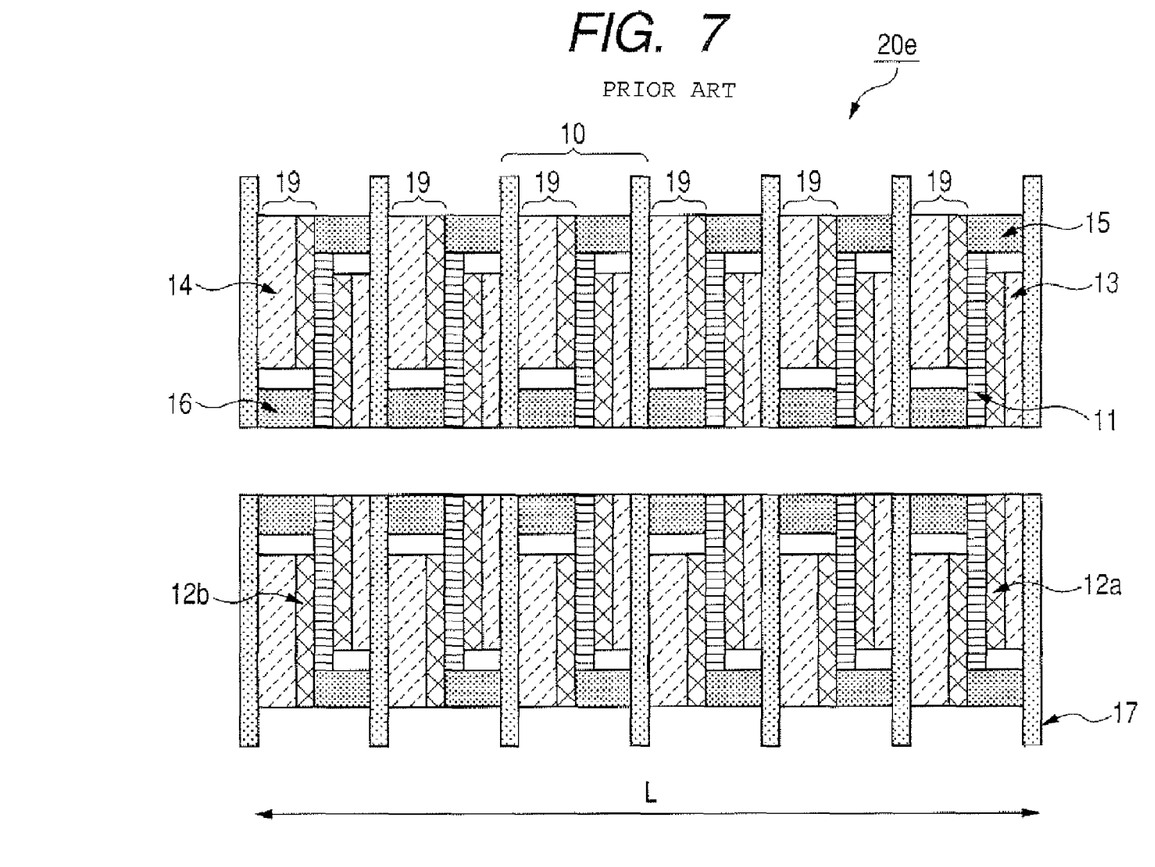
FIG. 7 is a cross-sectional view showing the structure of a fuel cell stack of Comparative Example of the prior art.
Figure 8:
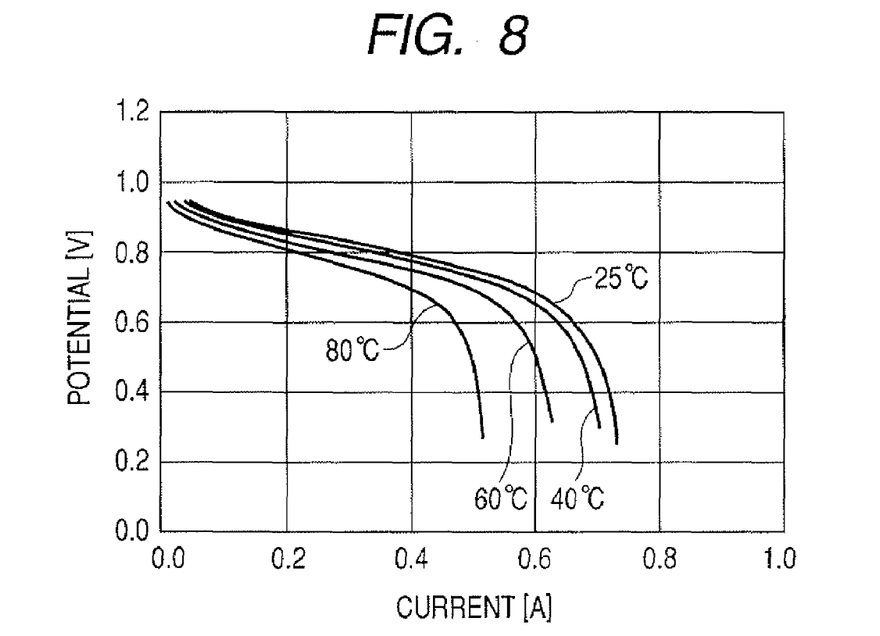
FIG. 8 is a graph showing current-voltage characteristics when the fuel cell units including oxygen flow field plates having the same thickness are separately allowed to generate electric power at different temperatures.
Figure 9:
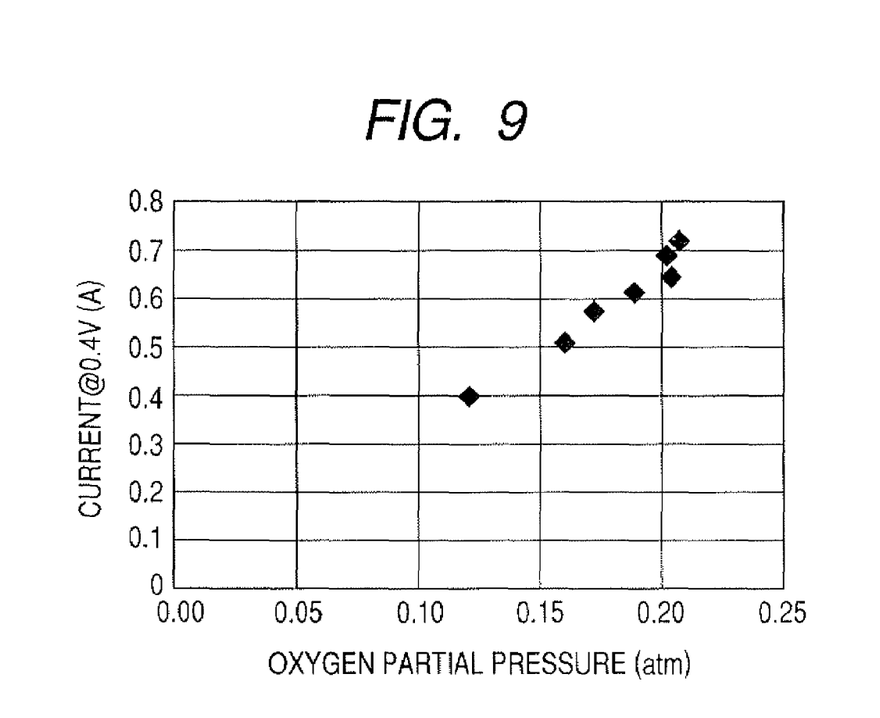
FIG. 9 is a graph showing a relationship between the oxygen partial pressure in an oxygen flow field plate and the maximum current value.

FIG. 7 is a cross-sectional view showing the structure of a fuel cell stack of Comparative Example. FIG. 8 is a graph showing current-voltage characteristics when fuel cell units having oxygen flow field plates with the same thickness were allowed to generate electric power at different temperatures. FIG. 9 is a graph showing a relationship between the oxygen partial pressure in an oxygen flow field plate and the maximum current value (which is a current at a voltage of 0.4 V). The fuel cell stack 20*e* of Comparative Example has a structure in which each of six fuel cell units 10 is formed in the same way such that the fuel cell unit 10*c* provided in the middle of the stack 20*a* in the above embodiment are simply stacked on top of one another. Thus, the same constituent members as those in FIG. 2 are denoted by the same reference numerals, and detailed description thereof will be omitted. Further, the oxygen flow field plate 14*c* and the opening 19*c* are the same for all six fuel cell units, and therefore they will be referred to as oxygen flow field plate 14 and opening 19, respectively.

The fuel cell stack 20*e* has a structure in which six fuel cell units 10 of the same specification are stacked, and the thickness of the oxygen flow field plate 14 and the height of the opening 19 are the same for all the six fuel cell units. The full length L of the fuel cell stack 20*e* is the same as that of the fuel cell stack 20*a* (FIG. 2) of the embodiment of the present invention.

In the case where a temperature distribution as shown in FIG. 3 occurs in the fuel cell stack of Comparative Example in which each thickness of the oxygen flow field plates 14 is the same, the maximum current values among the fuel cell units 10 become uneven. More specifically, the maximum current value of the fuel cell unit 10 having a high temperature, which is provided in the middle of the fuel cell stack 20*e*, becomes lower than the temperature of each of the fuel cell units 10 having a low temperature, which are provided at both ends of the fuel cell stack 20*e*, respectively.

FIG. 8 shows current-voltage characteristics when the fuel cell units 10 having the oxygen flow field plates 14 with the same thickness were allowed to generate electric power at different temperatures. The numbers in FIG. 8 represent the temperatures during generation of electric power. Thus, when the temperature is high, the maximum current value decreases. The reason for this is because the moisture content in the oxygen flow field plate 14 reaches a saturated water vapor pressure due to the water generated in the oxidizer electrode 12*b* during generation of electric power, so that the oxygen partial pressure in the oxygen flow field plate 14 decreases.

FIG. 9 shows a relationship between the oxygen partial pressure in the oxygen flow field presumed from the saturated water vapor pressure at each temperature and the measured maximum current value (which is a current at a voltage of 0.4 V). As shown in FIG. 9, when the oxygen partial pressure decreases, the maximum current value decreases. In other words, when the oxygen partial pressure in the oxygen flow field plate 14 decreases, the electromotive force when the same current value is obtained decreases.

FIG. 5 shows current-voltage characteristics when the fuel cell units 10 having the oxygen flow field plates 14 with different thicknesses were allowed to generate electric power at the same temperature. The numbers in FIG. 5 represent the thicknesses of the oxygen flow field plate 14. Thus, when the thickness of the oxygen flow field plate 14 is small, the maximum current value decreases. The reason for this is because as the thickness of the oxygen flow field plate 14 decreases, the diffusion performance of a gas from and to the atmosphere in the oxygen supply layer of the fuel cell unit is deteriorated, and the oxygen partial pressure in the oxygen flow field plate 14 decreases.

FIG. 6 shows a change in the maximum current value (which is a current at a voltage of 0.4 V) when the fuel cell units 10 having the oxygen flow field plates 14 with different thicknesses were allowed to generate electric power at the same temperature. As shown in FIG. 6, when the thickness of the oxygen flow field plate 14 becomes small, the maximum current value decreases. In other words, when the ventilation performance of a gas from and to the atmosphere in the oxygen supply layer of the fuel cell unit is deteriorated, the electromotive force when the same current value is obtained decreases.

The fuel cell stack of Comparative Example is an air breathing type, and generates electric power by supplying oxygen in the atmosphere to the oxidizer electrodes by natural diffusion through the oxygen flow field plates 14. Therefore, a mechanism of supplying oxygen is not required. Since the mechanism of supplying oxygen is not provided, the fuel cell stack can be miniaturized, and the number of parts and the power consumption involved in the operation can be made small. However, oxygen is supplied by natural diffusion, and thereby the maximum current value is limited not only by the thickness of the oxygen flow field plate 14 but also by the oxygen partial pressure in the oxygen flow field plate 14. Therefore, in the fuel cell unit 10 in the vicinity of the center of the stack in the stack direction, the temperature of which tends to become high, the water vapor pressure in the oxygen flow field plate 14 increases more than the fuel cell units at both ends of the fuel cell stack 20*e*, and the oxygen partial pressure decreases. Consequently, the maximum current value of the fuel cell unit 10 in the middle stage of the fuel cell stack 20*e* becomes lower than each maximum current value of the fuel cell units 10 at both ends of the fuel cell stack 20*e*.

When the maximum current value varies among the fuel cell units 10 in the fuel cell stack 20*e* as described above, the output current of the fuel cell stack 20*e* is limited by the fuel cell unit 10 in the middle of the stack having a small maximum current value, and the output density of the fuel cell stack decreases.

The maximum current value of each fuel cell unit 10 in the fuel cell stack 20*e* of Comparative Example, in which the thicknesses of the oxygen flow field plates 14 of the fuel cell units 10 are the same, is indicated by a broken line (b) of FIG. 4. In the fuel cell unit 10 in the middle of the stack having a increased temperature during generation of electric power, the maximum current value is decreased by 30% or more, compared with the fuel cell units 10*c* and 10*d* of the fuel cell stack 20*a* of the embodiment of the present invention which is indicated by a solid line (a).

Thus, compared with the fuel cell stack of Comparative Example, the fuel cell stack 20 of the embodiment of the present invention can reduce the variation in a maximum current value of the fuel cell units 10*a* to 10*f* in the fuel cell stack 20*a*. Accordingly, the potential generation ability of the fuel cell units 10*a* to 10*f* can be exhibited sufficiently, and the increase of a current value by about 50% can be realized.

The oxygen flow field plates 14*c* and 14*d* of the fuel cell units 10*c* and 10*d* in the middle of the stack, the temperature of which tends to increase, are made thick, whereby the level of decrease in the maximum current due to the decrease of an oxygen partial pressure is reduced. On the other hand, the oxygen flow field plates 14 of the fuel cell units 10*a* and 10*f* at both ends of the stack, the temperature of which is relatively low, are made thin, whereby the maximum current value of the fuel cell units 10*a* and 10*f* at both ends of the stack is decreased to be balanced therewith.

According to the fuel cell stack 20 of the embodiment of the present invention, in spite of the fact that the full length of the fuel cell stack 20*a* is the same as that of Comparative Example, the maximum current value (corresponding to A in FIG. 4) of the fuel cell stack 20*a* is larger than the maximum current value (corresponding to B in FIG. 4) of the fuel cell stack 20*e* of Comparative Example. Thus, the fuel cell stack 20 having a high output density per volume is obtained.

According to the fuel cell stack 20 of the embodiment of the present invention, an air breathing fuel cell stack in which the variation in the maximum current value among the fuel cell units 10*a* to 10*f* in the fuel cell stack 20*a* is suppressed, and which has a high output density per volume can be provided. Thus, the present invention can be used for a power source for small electrical equipments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-035779, filed Feb. 13, 2006, which is hereby incorporated by reference herein in its entirety.

What is claimed is:

1. A fuel cell stack comprising a plurality of fuel cell units stacked, each having an oxygen supply layer on a side of one surface of an electrolyte membrane,
   wherein each of the oxygen supply layers has an opening opened to the atmosphere in at least a part of a side surface thereof, and diffuses oxygen in the atmosphere from the opening to the side of the one surface of the electrolyte membrane, and diffuses water vapor from the side of the one surface of the electrolyte membrane to the opening, and
   wherein an area of an opening in each of the oxygen supply layers in all of the fuel cell units is adjusted corresponding to a temperature during generation of electric power such that an oxygen supply layer in a fuel cell unit having a higher temperature during generation of electric power has a larger area of the opening than an oxygen supply layer in a fuel cell unit having a lower temperature during generation of electric power.

* * * * *